Oct. 23, 1962 D. C. HEITSHU 3,059,759
CONVEYOR
Filed April 26, 1960
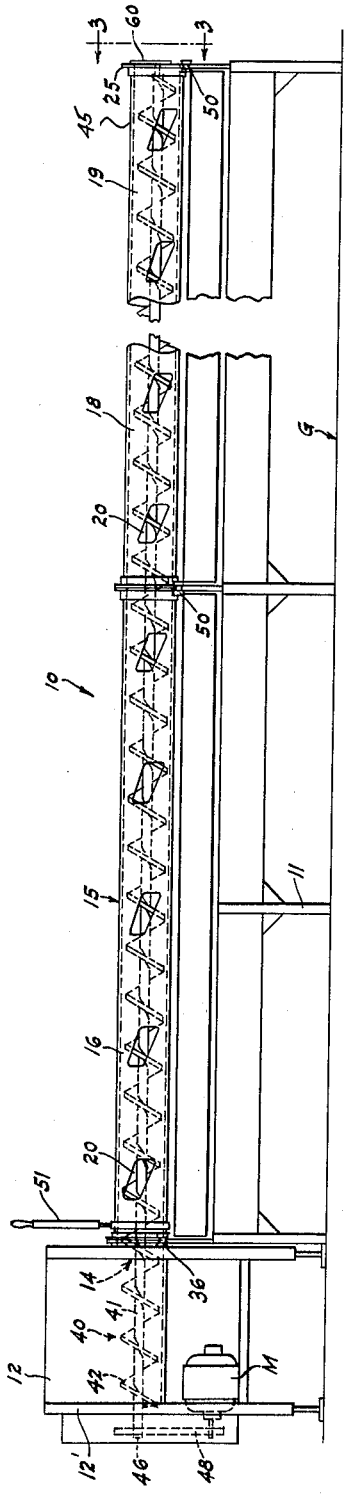
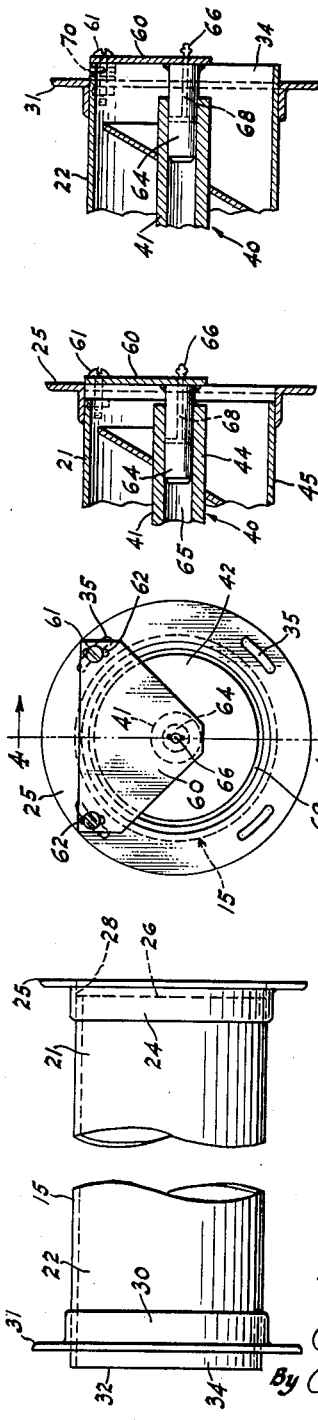
INVENTOR.
DANIEL C. HEITSHU
By Joseph Allen Brown
ATTORNEY

United States Patent Office 3,059,759
Patented Oct. 23, 1962

3,059,759
CONVEYOR
Daniel C. Heitshu, Shippensburg, Pa., assignor to Sperry Rand Corporation, New Holland, Pa., a corporation of Delaware
Filed Apr. 26, 1960, Ser. No. 24,714
3 Claims. (Cl. 198—213)

This invention relates to apparatus for conveying forage or the like. More specifically, the invention relates to an improvement in conveyors of the type shown in U.S. Patent No. 2,867,314, issued January 6, 1959.

The structure shown in such patent comprises a hopper adapted to receive forage, shelled corn, food supplements or the like. The hopper has a lateral discharge opening in its bottom. Communicating with the opening is a conveyor comprising a tube in which an auger is rotatable. The auger withdraws material from the hopper and conveys it through the tube and away from the hopper. The tube has a plurality of laterally disposed, longitudinally spaced holes. Each hole has a lower wall portion and these wall portions are positioned progressively lower from a high point adjacent the hopper to a low point at the remote or rear end of the tube. The progressively lower positioning of each hole wall portion enables the distribution of material evenly along the length of the conveyor. The amount of material discharged from one hole will be substantially the same as the amount of material discharged from any other hole. To adjust the conveyor to secure a proper discharge rate from the holes, the tube is angularly adjustable as a whole about its longitudinal axis. This is accomplished by a handle at the hopper end of the tube. To facilitate rotatable adjustment of the tube, the tube is mounted on rollers carried on a suitable support frame.

Conventionally, the auger rotatable in the tube is supported at its hopper end only. The remainder of the auger rests on the bottom of the tube and "floats" as material is conveyed through the tube by the auger. The lack of support for the auger along its length causes some problems, particularly at the rear end of the tube. The free, unsupported terminal end of the auger tends to "whip" when the conveyor is operated. The flights on the auger terminal end, bear heavily against the inside of the conveyor tube whereby both the tube and the auger flights are subjected to excessive wear.

To support the terminal end of the auger by some conventional means is unsatisfactory in this type of conveyor because it is essential that the end of the conveyor tube be substantially left open so that material may be discharged therefrom in an unobstructed manner. Further, any auger support means must take into account that the conveyor tube is angularly adjustable. Thus, any terminal end auger support means must be operative regardless of the adjusted position of the conveyor tube and not interfere with angular adjustment of the tube.

One object of this invention is to provide means for supporting the terminal end of an auger in a conveyor of the character described.

Another object of this invention is to provide terminal end auger support means which does not obstruct the discharge of material from the conveyor tube in which the auger is operative.

Another object of this invention is to provide terminal end auger support means which is both radially and angularly adjustable relative to the tube in which the auger operates to account for the particular angular adjustment of the conveyor tube.

Another object of this invention is to provide auger support means which is carried on the conveyor tube itself and is easily connected to the tube regardless of which end of the tube is disposed remote from the hopper.

A further object of this invention is to provide simple means for lubricating the auger support means.

A still further object of this invention is to provide auger support means which is inexpensive to manufacture, assemble, and keep in operating condition.

Other objects of this invention will be apparent hereinafter from the specification and from the recital in the appended claims.

In the drawing:

FIG. 1 is a fragmentary side elevation of a conveyor having means constructed according to this invention for supporting the terminal end of the auger operable in the conveyor tube;

FIG. 2 is an enlarged fragmentary side elevational view of one of the tube sections which makes up the overall conveyor tube, such view showing that one end of the section comprises a male end and the other end of the section comprises a female end;

FIG. 3 is an enlarged end view of the conveyor taken on the line 3—3 of FIG. 1 looking in the direction of the arrows and showing the auger support means of this invention;

FIG. 4 is a vertical section taken on the line 4—4 of FIG. 3 looking in the direction of the arrows, and showing the auger support means mounted on a female end of the conveyor tube; and FIG. 5 is a view similar to FIG. 4 but showing the auger support means mounted on a male end of the conveyor tube.

Referring now to the drawing by numerals of reference, and first to FIG. 1, 10 denotes conveying apparatus which comprises a support frame 11 resting on the ground G. Frame 11 has a hopper or supply source 12 mounted on one end thereof. The hopper has a lateral discharge opening 14 which communicates with a generally horizontally extending tube 15. Tube 15 comprises a plurality of tube sections each of which may be of any suitable length, such as ten feet long. In FIG. 1, a full tube section 16 is shown, and two partial sections, namely section 18 and section 19. The section 19 comprises the last section in the tube structure.

Tube 15 has a plurality of longitudinally spaced discharge openings 20. The successive openings in the tube are all of identical configuration, as shown. However, they are angularly displaced relative to each other as described in Patent No. 2,867,314 to produce a uniform discharge along the length of the tube. Specifically, each hole has a lower wall portion disposed progressively lower from a high point adjacent the hopper to a low point at the far end of the tube.

All of the sections which make up the conveyor tube 15 are of the same construction. As shown in FIG. 2, each tube section has a female end 21 and a male end 22. The female end 21 is surrounded by a collar 24 having a radially outwardly projecting flange 25. The flange 25 is spaced axially outwardly of the end 26 of the tube section whereby a socket 28 is provided. The male end 22 of the tube section has a collar 30 and radial flange 31. However, the flange 31 is spaced inwardly from the adjacent end 32 of the tube section whereby an axially projecting portion 34 is provided. Thus, when the different tube sections are connected together to make an overall tube, the portion 34 of a male end of one tube section is projected into the socket 28 of a female section of another tube section. This interconnection of the successive tube sections provides a convenient way of coaxially aligning the respective sections and gives the overall structural stability.

The flanges 25 and 31 on the tube sections are provided with arcuate slots 35. In each flange, there are four arcuate slots, spaced ninety degrees apart. Bolts are passed through these slots to connect the end of one tube section to the adjacent end of the next tube section.

Means is provided at 36 (FIG. 1) whereby either a male or female end of a tube section may be connected to hopper 12. If a female end of a tube section is connected to the hopper, then the remote end of the conveyor tube will have an axially projecting collar 34. If a male end is connected to the hopper 12, then the remote end of the conveyor tube will be a female end 21 with a socket 28.

Forage material placed in the hopper 12 is removed therefrom by an auger 40 having a shaft 41 and flights 42. The auger 40 extends all the way through tube 15 and has a terminal end 44 (FIG. 4) adjacent the tail or rear end 45 of the tube. Auger shaft 41 has a portion 46 which projects through side wall 12' of the hopper 12 and is connected to a power source, namely an electric motor M, through power transmission means 48. The rotation of the auger 40 is such that material is withdrawn from the hopper 12 and conveyed through the conveyor tube 15 toward the rear end 45. As the material moves through tube 15, it is discharged laterally out of the openings 20. Since the openings 20 are angularly displaced relative to each other, the discharge of material out of one opening will be substantially the same as the discharge of material out of any other opening.

Tube 15 is supported on rollers 50 whereby the tube may be angularly adjusted about its longitudinal axis. Such adjustment is achieved by means of a handle 51 connected to the tube adjacent the hopper 12. Suitable means, not shown, is provided to lock the tube in angularly adjusted position. The angular adjustment of the tube 15 is provided so that the angular position of the holes 20 can be properly established to secure a desired rate of discharge along the length of the tube. When properly adjusted, the major portion of the material withdrawn from the hopper 12 is discharged through the lateral openings before it reaches the rear end 45 of tube 15. However, invariably there is some material left over and it is discharged out of the rear end of the tube.

Conventionally, the terminal end 44 of the auger 40 is allowed to float freely in the tube 15. According to this invention, the auger terminal end is supported. When a female end 21 of the tube is disposed at the rear end of the conveyor, the auger end 44 is supported as shown in FIGS. 3 and 4. Mounted on tube 15 is a support member 60 which extends from tube flange 25 radially inwardly terminating at a point adjacent auger shaft 41. The support member 60 is connected to flange 25 by fasteners 61 which project through the two top slots 35 in the tube flange. As shown in FIG. 3, the support member 60 has slots 62 which register with the flange slots 35. Since the slots 35 are arcuate, and elongate, the support member 60 may be angularly adjusted by releasing the fasteners 61 and swinging the support member. When in a desired position, the support member can be locked back in place by tightening the fasteners. In like respect, the slots 62 provide for a radial adjustment of the support member 60 whereby the radial inner end of the support member can be properly positioned relative to the auger shaft 41.

At its radial inner end, support member 60 carries a bearing member 64 which engages and supports the terminal end 44 of the auger. As shown in FIG. 4, the auger shaft 41 has an axial bore 65 into which the bearing member 64 projects. The bearing member is in the form of a stud the diameter of which is such relative to bore 65 that an appropriate rotatable support is provided for the auger end. A grease fitting 66 is carried on the support member 60 whereby a lubricant may be forced through conduit 68 whereby the periphery of the bearing member may be lubricated to facilitate rotation of the terminal end 44 of the auger relative to the bearing member.

The adjusted position of the support member 60 in a radial direction is intended to be such that a clearance space 69 is provided between the periphery of the auger flight and the rear end 45 of the conveyor tube. The spacings 69 can be varied at will to provide a desired clearance between the parts.

In operating the conveyor, the operator will position the tube 15 in a given angular position. With the support structure of this invention, the support member 60 can be angularly adjusted relative to the tube 15 merely by loosening the fastener 61 and appropriately adjusting the support members relative to the slots 35. Thus, a proper radial and angular adjustment of the auger support means can be achieved at all times relative to the angularly adjusted position of the conveyor tube.

In the event that the rear end 45 of the conveyor tube comprises a male end as shown in FIG. 5, then spacer means 70 is provided between support member 60 and flange 31 to compensate for the projecting portion 34 of the tube. The spacer means may be of any desired construction such as an appropriate number of washers. Thus, the auger support means of this invention may be used on the conveyor regardless of whether a male or a female end is at the terminal end of the conveyor.

With this structure, the terminal end of the auger is positively supported and it will not whip when the conveyor is operating. Thus, wear and tear at the rear end of the tube 15 is minimized. Moreover, since the auger is supported from an upper portion of tube 15, the support structure in no way obstructs the discharge of excess material out of the bottom of the rear end of the conveyor tube. The auger support means is carried solely on the conveyor tube and is adjustable with the tube. This eliminates the necessity for separate auger support structure carried on the frame 11 or elsewhere which would be more expensive than that provided herein and render the auger support more complicated and expensive.

While this invention has been described in connection with a particular embodiment thereof, it will be understood that it is capable of further modifications and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention what I claim is:

1. A conveyor for forage material and the like comprising, in combination, a generally horizontally extending tube having an upper portion, a bottom portion and a plurality of longitudinally spaced discharge holes, means supporting said tube for angular adjustment about its longitudinal axis, an auger within said tube and having an axis parallel to the tube axis, means for rotating said auger whereby material deposited in a forward end of said tube is conveyed toward a rear end of the tube, said auger having a shaft, helical flights and a terminal end adjacent said tube rear end, and means supporting said auger terminal end whereby the weight of the auger is not carried by said tube bottom portion and without obstructing discharge of material from said bottom portion of the tube, said supporting means comprising a support member extending radially inwardly from said upper portion of said rear end of said tube to adjacent said auger shaft, a bearing member carried on the radial inner end of said support member and projecting into said tube, said bearing member engaging and supporting said auger shaft at said terminal end, a radial flange on said upper portion of said tube, and means connecting a radial outer end of said support member to said radial flange on said tube for angular adjustment relative thereto whereby said support member may be appropriately positioned in relation to the angularly adjusted position of said tube.

2. A conveyor for forage material and the like as recited in claim 1 wherein said radial flange on said tube has a pair of slots and said radial outer end of said support member has a pair of slots which register with said flange slots, said connecting means being projectable through said slots to releasably connect said support member to said flange, the relative extensions of said slots being such that said support member is both radially and angularly adjustable relative to said tube.

3. A conveyor for forage material and the like as recited in claim 1 wherein said connecting means comprises fastening members which extend through said support member and said flange, one of these parts at least having arcuate slots concentric with the axis of the tube to receive the fastening members and permit said angular adjustment of the support member relative to the flange on the tube.

References Cited in the file of this patent

UNITED STATES PATENTS

| | | |
|---|---|---|
| 857,528 | Manahan | June 18, 1907 |
| 1,795,760 | Carney | Mar. 10, 1931 |
| 2,507,873 | Ward | May 16, 1950 |
| 2,867,314 | Hansen | Jan. 6, 1959 |

FOREIGN PATENTS

| | | |
|---|---|---|
| 162,023 | Australia | Mar. 18, 1955 |